United States Patent
Wang (10) Patent No.: US 10,402,083 B2
(45) Date of Patent: Sep. 3, 2019

(54) FINGERPRINT EVENT PROCESSING METHOD, APPARATUS, AND TERMINAL

(71) Applicant: Huawei Technologies Co., Ltd., Shenzhen (CN)

(72) Inventor: Zaishang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/551,236

(22) PCT Filed: Feb. 16, 2015

(86) PCT No.: PCT/CN2015/073205
§ 371 (c)(1),
(2) Date: Aug. 15, 2017

(87) PCT Pub. No.: WO2016/131181
PCT Pub. Date: Aug. 25, 2016

(65) Prior Publication Data
US 2018/0046347 A1    Feb. 15, 2018

(51) Int. Cl.
*G06F 3/0488* (2013.01)
*G06F 21/32* (2013.01)
(Continued)

(52) U.S. Cl.
CPC ......... *G06F 3/0488* (2013.01); *G06F 21/32* (2013.01); *G06K 9/0002* (2013.01); *G06F 3/0482* (2013.01)

(58) Field of Classification Search
CPC ...... G06F 3/0488; G06F 21/32; G06F 3/0482; G06K 9/0002
See application file for complete search history.

(56) References Cited

U.S. PATENT DOCUMENTS

2005/0041841 A1   2/2005  Yoo et al.
2010/0321152 A1  12/2010  Argudyaev et al.
(Continued)

FOREIGN PATENT DOCUMENTS

CN   102770831 A   11/2012
CN   103577850 A    2/2014
(Continued)

*Primary Examiner* — Premal R Patel
(74) *Attorney, Agent, or Firm* — Leydig, Voit & Mayer, Ltd.

(57) ABSTRACT

Embodiments of the present disclosure relate to the field of communications technologies, and provide a fingerprint event processing method and apparatus, and a terminal, so as to resolve a problem of how to simplify operation steps of using a terminal. The method includes: receiving, by a terminal, a first fingerprint by using a fingerprint sensor; generating, by the terminal, a fingerprint event according to the first fingerprint; when an operation to be executed by the terminal includes an identity authentication operation, executing, by the terminal, the identity authentication operation according to the fingerprint event; and when the operation to be executed by the terminal does not include the identity authentication operation, executing, by the terminal, an operation corresponding to a first preset event according to the first preset event. Solutions provided in the embodiments of the present disclosure are applicable to processing of a fingerprint event.

22 Claims, 5 Drawing Sheets

(51) Int. Cl.
*G06K 9/00* (2006.01)
*G06F 3/0482* (2013.01)

(56) References Cited

U.S. PATENT DOCUMENTS

| | | |
|---|---|---|
| 2012/0321150 A1 | 12/2012 | Ranganathan et al. |
| 2013/0076485 A1* | 3/2013 | Mullins .................. G06F 21/32 340/5.83 |
| 2014/0218311 A1 | 8/2014 | Huang et al. |
| 2014/0359758 A1 | 12/2014 | Lee et al. |
| 2015/0347811 A1* | 12/2015 | Kim .................. G06K 9/00033 382/124 |
| 2016/0011767 A1* | 1/2016 | Jung .................... G06F 3/0488 715/847 |

FOREIGN PATENT DOCUMENTS

| | | |
|---|---|---|
| CN | 103745147 A | 4/2014 |
| CN | 103984495 A | 8/2014 |
| CN | 103995998 A | 8/2014 |
| CN | 104182275 A | 12/2014 |
| EP | 2230623 A1 | 9/2010 |
| RU | 61899 U1 | 3/2007 |
| RU | 2412460 C2 | 2/2011 |

* cited by examiner

FINGERPRINT EVENT PROCESSING METHOD, APPARATUS, AND TERMINAL

CROSS-REFERENCE TO RELATED APPLICATIONS

This application is a National Stage of International Application No. PCT/CN2015/073205, filed on Feb. 16, 2015, which is hereby incorporated by reference in its entirety.

TECHNICAL FIELD

Embodiments of the present disclosure relate to the field of communications technologies, and in particular, to a fingerprint event processing method and apparatus, and a terminal.

BACKGROUND

As terminals become widely popular in users' life, a user may use various application programs such as electronic books, browsers, shopping malls, and games by using terminals any time anywhere. Because terminals have limited screen sizes, to achieve desirable user experience, when a user is using an application program, an entire screen of a terminal usually displays a page of the application program.

When a terminal is running an application program, a page of the application program is displayed in a full-screen mode. Therefore, when a user performs an operation of exiting an application program or an operation of switching an application program, relatively many steps need to be performed to accomplish such an operation. For example, for an exit operation, a user needs to exit an application program by using an exit instruction on a page of the application program. For an operation of switching an application program, a user needs to exit an application program by using the foregoing exit operation and clicks on an interface of an application program to be run after a main menu interface is displayed. However, to exit an application program by using an exit instruction on a page of the application program causes an increase in operation procedures of exiting the application program. An operation of first exiting a previous application program and clicking on another application program on a main menu interface to run the other application program also causes an increase in operation procedures of switching an application program. Therefore, consequently, steps of using a terminal by a user become complex.

SUMMARY

Embodiments of the present disclosure provide a fingerprint event processing method and apparatus, and a terminal, so as to resolve a problem of how to simplify operation steps of using a terminal.

According to a first aspect, an embodiment of the present disclosure provides a fingerprint event processing method. The method is applied to a terminal having a fingerprint sensor, and the method includes:

receiving, by the terminal, a first fingerprint by using the fingerprint sensor;

generating, by the terminal, a fingerprint event according to the first fingerprint;

when an operation to be executed by the terminal includes an identity authentication operation, executing, by the terminal, the identity authentication operation according to the fingerprint event; and when the operation to be executed by the terminal does not include the identity authentication operation, executing, by the terminal, an operation corresponding to a first preset event according to the first preset event.

In a first possible embodiment, with reference to the first aspect, after the generating, by the terminal, a fingerprint event according to the first fingerprint, the method further includes:

executing, by the terminal, an operation corresponding to a second preset event according to the second preset event when the terminal receives a second fingerprint by using the fingerprint sensor within a preset time.

In a second possible embodiment, with reference to the first aspect or the first possible embodiment in the first aspect, after the receiving, by the terminal, a first fingerprint by using the fingerprint sensor, the method further includes:

generating, by the terminal, the first preset event according to the first fingerprint.

In a third possible embodiment, with reference to the first possible embodiment of the first aspect, the second preset event is generated by the terminal according to the first fingerprint and the second fingerprint.

In a fourth possible embodiment, with reference to the first aspect or any one of the foregoing possible embodiments of the first aspect, when the operation to be executed by the terminal does not include the identity authentication operation, the executing, by the terminal, an operation corresponding to a first preset event according to the first preset event specifically includes:

when the operation to be executed by the terminal does not include the identity authentication operation, determining a current application scenario run by the terminal; and executing, by the terminal, the operation corresponding to the first preset event according to the first preset event corresponding to the current application scenario.

In a fifth possible embodiment, with reference to the first possible embodiment of the first aspect, the executing, by the terminal, an operation corresponding to a second preset event according to the second preset event when the terminal receives a second fingerprint by using the fingerprint sensor within a preset time specifically includes:

when the terminal receives the second fingerprint by using the fingerprint sensor within the preset time, determining a current application scenario run by the terminal; and executing, by the terminal, the operation corresponding to the second preset event according to the second preset event corresponding to the current application scenario.

In a sixth possible embodiment, with reference to the first aspect or any one of the foregoing possible embodiments of the first aspect, the first preset event is a Home button event.

According to a second aspect, an embodiment of the present disclosure provides a fingerprint event processing apparatus. The apparatus is applied to a terminal having a fingerprint sensor, and the apparatus includes:

a receiving module, configured to: receive a first fingerprint by using the fingerprint sensor, and provide the first fingerprint to a generation module;

the generation module, configured to generate a fingerprint event according to the first fingerprint; and an execution module, configured to: when an operation to be executed includes an identity authentication operation, execute the identity authentication operation according to the fingerprint event; and when the operation to be executed does not include the identity authentication operation, execute an operation corresponding to a first preset event according to the first preset event.

In a first possible embodiment, with reference to the second aspect, the receiving module is further configured to receive a second fingerprint by using the fingerprint sensor within a preset time after receiving the first fingerprint by using the fingerprint sensor; and the execution module is further configured to execute an operation corresponding to a second preset event according to the second preset event after the receiving module receives the second fingerprint.

In a second possible embodiment, with reference to the second aspect or the first possible embodiment of the second aspect, the generation module is further configured to generate the first preset event according to the first fingerprint.

In a third possible embodiment, with reference to the first possible embodiment of the second aspect, the generation module is further configured to generate the second preset event according to the first fingerprint and the second fingerprint.

In a fourth possible embodiment, with reference to the second aspect or any one of the foregoing possible embodiments of the second aspect, in the process of when the operation to be executed does not include the identity authentication operation, executing an operation corresponding to a first preset event according to the first preset event, the execution module is specifically configured to:

when the operation to be executed does not include the identity authentication operation, determine a running current application scenario; and execute the operation corresponding to the first preset event according to the first preset event corresponding to the current application scenario.

In a fifth possible embodiment, with reference to the first possible embodiment of the second aspect, in the process of executing an operation corresponding to a second preset event according to the second preset event when receiving the second fingerprint by using the fingerprint sensor within the preset time, the execution module is specifically configured to:

when receiving the second fingerprint by using the fingerprint sensor within the preset time, determine a running current application scenario; and execute the operation corresponding to the second preset event according to the second preset event corresponding to the current application scenario.

In a sixth possible embodiment, with reference to the second aspect or any one of the foregoing possible embodiments of the second aspect, the first preset event is a Home button event.

According to a third aspect, an embodiment of the present disclosure provides a terminal, where the terminal has a fingerprint sensor, and includes:

a memory, configured to store information including a program instruction;

a fingerprint sensor, configured to: receive a first fingerprint, and provide the first fingerprint to a processor; and the processor, coupled to the memory and the fingerprint sensor, configured to control execution of the program instruction, and specifically configured to: generate a fingerprint event according to the first fingerprint; when an operation to be executed includes an identity authentication operation, execute the identity authentication operation according to the fingerprint event; and when the operation to be executed does not include the identity authentication operation, execute an operation corresponding to a first preset event according to the first preset event.

In a first possible embodiment, with reference to the third aspect, the fingerprint sensor is further configured to receive a second fingerprint within a preset time after receiving the first fingerprint; and the processor is further configured to execute an operation corresponding to a second preset event according to the second preset event after the fingerprint sensor receives the second fingerprint.

In a second possible embodiment, with reference to the third aspect or the first possible embodiment of the third aspect, the processor is further configured to generate the first preset event according to the first fingerprint.

In a third possible embodiment, with reference to the first possible embodiment of the third aspect, the processor is further configured to generate the second preset event according to the first fingerprint and the second fingerprint.

In a fourth possible embodiment, with reference to the third aspect or any one of the foregoing possible embodiments of the third aspect, in the process of when the operation to be executed does not include the identity authentication operation, executing an operation corresponding to a first preset event according to the first preset event, the processor is specifically configured to:

when the operation to be executed does not include the identity authentication operation, determine a running current application scenario; and execute the operation corresponding to the first preset event according to the first preset event corresponding to the current application scenario.

In a fifth possible embodiment, with reference to the first possible embodiment of the third aspect, in the process of executing an operation corresponding to a second preset event according to the second preset event when receiving the second fingerprint by using the fingerprint sensor within the preset time, the processor is specifically configured to:

when receiving the second fingerprint within the preset time, determine a running current application scenario; and execute the operation corresponding to the second preset event according to the second preset event corresponding to the current application scenario.

In a sixth possible embodiment, with reference to the third aspect or any one of the foregoing possible embodiments of the third aspect, the first preset event is a Home button event.

In the embodiments of the present disclosure, a terminal receives a first fingerprint by using a fingerprint sensor, generates a fingerprint event according to the first fingerprint, when an operation to be executed by the terminal includes an identity authentication operation, executes the identity authentication operation according to the fingerprint event, and when the operation to be executed by the terminal does not include the identity authentication operation, executes an operation corresponding to a first preset event according to the first preset event. In the embodiments of the present disclosure, a fingerprint event may trigger different operations. After a terminal generates a fingerprint event, whether the terminal executes an identity authentication operation or an operation corresponding to a first preset event is determined according to whether an operation to be executed by the terminal includes the identity authentication operation, so as to simplify operation steps of using the terminal.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The present disclosure is applicable to a terminal having a fingerprint sensor and a computer having a terminal. The terminal is, for example, a mobile phone (or referred to as a "cellular" phone), and the computer may be, for example, a portable, pocket-size, handheld, computer built-in, or vehicle-mounted mobile apparatus. The terminal and the computer exchange voices and/or data with a radio access network. For example, it may be a device such as a PCS (personal communication service) phone, a cordless telephone set, a Session Initiation Protocol (SIP) phone, a WLL (wireless local loop) station, or a PDA (personal digital assistant). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

In addition, terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. Components may, for example, communicate by using a local and/or remote process according to a signal having one or more data packets (for example, data of two components that is from interaction with another component in a local system, a distributed system, and/or a network; for example, the internet that interacts with another system by using a signal).

Figure 1:
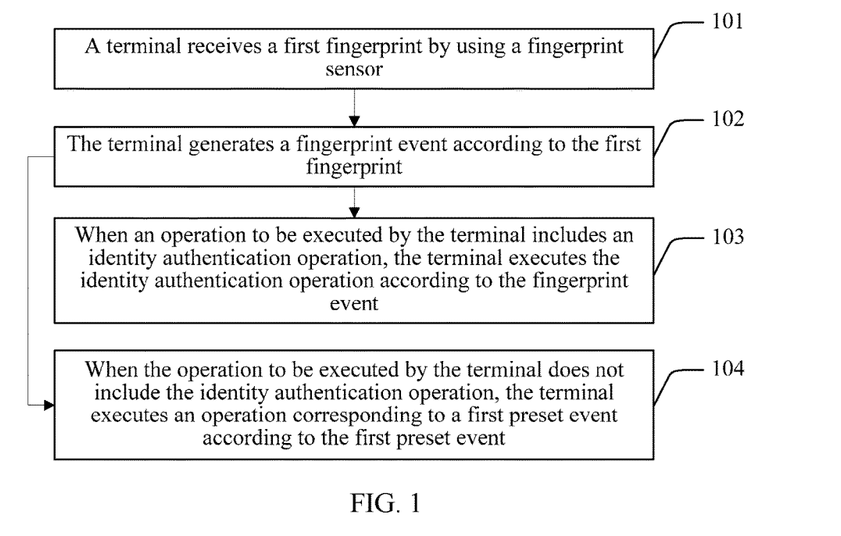
FIG. 1 is a flowchart of a fingerprint event processing method according to an embodiment of the present disclosure.

As shown in FIG. 1, an embodiment of the present disclosure provides a fingerprint event processing method. The method is applied to a terminal having a fingerprint sensor, and the method includes:

Step 101: The terminal receives a first fingerprint by using the fingerprint sensor.

It can be understood that the first fingerprint is any fingerprint and is not limited to a fingerprint that is consistent with an authentication fingerprint prestored in an execution terminal.

Step 102: The terminal generates a fingerprint event according to the first fingerprint.

Step 103: When an operation to be executed by the terminal includes an identity authentication operation, the terminal executes the identity authentication operation according to the fingerprint event.

The identity authentication operation may be an operation such as a payment operation, an operation of unlocking a screen, and an operation of opening a private application program.

Step 104: When the operation to be executed by the terminal does not include the identity authentication operation, the terminal executes an operation corresponding to a first preset event according to the first preset event.

In this embodiment of the present disclosure, a terminal receives a first fingerprint by using a fingerprint sensor, generates a fingerprint event according to the first fingerprint, when an operation to be executed by the terminal includes an identity authentication operation, executes the identity authentication operation according to the fingerprint event, and when the operation to be executed by the terminal does not include the identity authentication operation, executes an operation corresponding to a first preset event according to the first preset event. In this embodiment of the present disclosure, a fingerprint event may trigger different operations. After a terminal generates a fingerprint event, whether the terminal executes an identity authentication operation or an operation corresponding to a first preset event is determined according to whether an operation to be executed by the terminal includes the identity authentication operation, so as to simplify operation steps of using the terminal.

It should be further noted that in step 102 shown in FIG. 1, that the terminal generates a fingerprint event according to the first fingerprint may specifically include: after the terminal receives the first fingerprint in a fingerprint recognition area by using the fingerprint sensor, generates a first fingerprint event according to information such as a position (for example, the position of the first fingerprint is represented by using coordinates) of the first fingerprint on a screen, a force applied when the first fingerprint is being received, and a time of receiving the first fingerprint.

In step 103 shown in FIG. 1, that when an operation to be executed by the terminal includes an identity authentication operation, the terminal executes the identity authentication operation according to the fingerprint event may specifically include: first extracting, by the terminal, a prestored authentication fingerprint, then comparing the first fingerprint with the authentication fingerprint, when the first fingerprint is consistent with the authentication fingerprint, completing the identity authentication operation, and displaying, on a display screen, an interface (for example, a main menu interface displayed after a screen is turned on and unlocked, and a payment success interface) that the identity authentication operation is successfully completed; and when the first fingerprint is inconsistent with the authentication fingerprint, completing the identity authentication operation, and displaying, on the display screen, an interface (for example, an interface when the screen is turned on and locked, and a payment failure interface) corresponding to rejection of enabling of the identity authentication operation. It can be understood that when the identity authentication operation is triggered to be executed, it may be considered that execution of an operation corresponding to the first preset event is aborted.

The first preset event in the present disclosure is generated by the terminal according to the first fingerprint. Optionally, after receiving the first fingerprint by using the fingerprint sensor, the terminal may generate both the fingerprint event and the first preset event according to the first fingerprint, or may generate the fingerprint event immediately after the first fingerprint is received, and when determining that the operation to be executed does not include the identity authentication operation, the terminal generates the first preset event according to the first fingerprint.

The first preset event may be a user set event or a system preset event, for example, a Home button event (that is, an event to return to a main menu interface), a return key event (that is, an event to return to a previous level), and a dial event (that is, an event to enter a dial interface).

In step 104 shown in FIG. 1, when the operation to be executed by the terminal does not include the identity authentication operation, the terminal executes an operation corresponding to a first preset event according to the first preset event. For example, when the first preset event is the Home button event, when the terminal detects that in this case the operation to be executed does not include the identity authentication operation, the terminal executes the event of returning to a main menu interface corresponding to a Home button.

In addition, it should be noted that the first fingerprint in the present disclosure is not limited to a fingerprint prestored in an execution terminal. That is, the first fingerprint may be any fingerprint. When a running environment has a condition for executing the identity authentication operation, the terminal executes the identity authentication operation. If the first fingerprint is inconsistent with the authentication fingerprint, the terminal displays, on the display screen, an interface corresponding to rejection of successful completion of the identity authentication operation. When the running environment does not have the condition for executing the identity authentication operation, after receiving the first fingerprint, the terminal directly triggers execution of an operation corresponding to the first preset event and does not need to determine whether the first fingerprint is consistent with the authentication fingerprint. It can be understood that the authentication fingerprint is used to authenticate whether a received fingerprint is a secure fingerprint. In the present disclosure, the identity authentication operation can be successfully completed for only a secure fingerprint.

It should be further noted that when the operation to be executed by the terminal does not include the identity authentication operation, the terminal determines a current application scenario run by the terminal and then executes the operation corresponding to the first preset event according to the first preset event corresponding to the current application scenario. That is, different application scenarios correspond to different first preset events.

For example, when the current application scenario is a scenario for running a non-audio/video application program, the first preset event may be the Home button event. If the current application scenario is a scenario for running an audio/video application program, the first preset event may be a pause button event.

In the present disclosure, the operation to be executed by the terminal is executed by using the fingerprint event, so that not only execution of the identity authentication operation corresponding to the fingerprint event can be implemented, but also execution of an operation corresponding to a preset event (an event such as the Home button event) can be implemented, so as to avoid a problem in the prior art that operations of using the Home button are complex because the Home button is hidden in a full-screen mode. In addition, in the present disclosure, operations corresponding to preset events corresponding to different current application scenarios may be executed according to the different current application scenarios of the terminal. In addition, when the terminal in the prior art has a Home button, the present disclosure may implement generation of the Home button event without using the physical Home button.

Figure 2:
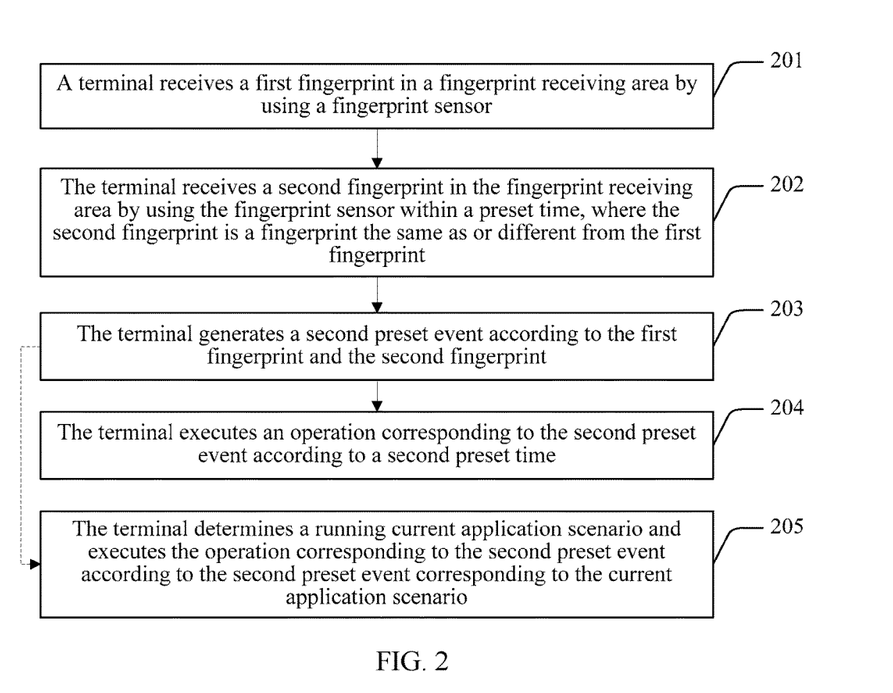
FIG. 2 is a flowchart of another fingerprint event processing method according to an embodiment of the present disclosure.

Optionally, in another embodiment of the present disclosure, the present disclosure may further include a fingerprint event processing method. As shown in FIG. 2, the method includes:

Step 201: A terminal receives a first fingerprint in a fingerprint receiving area by using a fingerprint sensor.

Step 202: The terminal receives a second fingerprint in the fingerprint receiving area by using the fingerprint sensor within a preset time, where the second fingerprint is a fingerprint the same as or different from the first fingerprint.

The present disclosure does not limit a range of the preset time. For example, the preset time may be 2 s or 3 s. The preset time may be a system default time or may be a user-defined time.

In addition, the present disclosure does not limit whether the second fingerprint is the same as the first fingerprint. For example, the first fingerprint is a forefinger fingerprint, and the second fingerprint may be a forefinger fingerprint, a middle finger fingerprint or the like.

Step 203: The terminal generates a second preset event according to the first fingerprint and the second fingerprint.

Optionally, before generating the second preset event, the terminal may first determine whether an operation to be executed by the terminal includes an identity authentication operation; and when the operation to be executed by the terminal does not include the identity authentication operation, the terminal then generates the second preset event according to the first fingerprint and the second fingerprint.

Optionally, after receiving the second fingerprint, the terminal may not need to determine whether the operation to be executed by the terminal includes the identity authentication operation, but instead, generates the second preset event directly according to the first fingerprint and the second fingerprint.

It can be understood that the second preset event and a first preset event are different preset events. That is, the second preset event is a user set event or a system preset event.

Step 204: The terminal executes an operation corresponding to the second preset event according to a second preset time.

Step 205: The terminal determines a running current application scenario and executes the operation corresponding to the second preset event according to the second preset event corresponding to the current application scenario.

It should be noted that step 204 and step 205 are two parallel manners. A manner of step 204 is that the terminal does not need to consider the current application scenario run by the terminal but instead executes the corresponding operation according to the fixed second preset event; and a manner of step 205 is that the terminal needs to determine the running current application scenario before executing the operation corresponding to the second preset event, and then executes the operation corresponding to the second preset event in different current application scenarios according to different current application scenarios. It can be understood that the manner of step 204 indicates there is only one second preset event, and the manner of step 205 indicates that there is at least one (that is, multiple second preset events may exist) second preset event.

In addition, the manner of determining the second preset event by using the current application scenario in this step is the same as the foregoing manner of determining the first preset event by using the current application scenario, and details are no longer described one by one herein.

For a user, when the user needs to execute the identity authentication operation (assuming that the identity authentication operation is a payment operation), the user inputs a fingerprint (the first fingerprint) in the fingerprint receiving area, after the terminal receives the first fingerprint and generates the fingerprint event, determines a running environment, and there is a condition for executing the identity authentication operation, completes payment.

When the user needs to execute an operation of returning to a main menu interface (a system presets the first preset event as the Home button event), the user inputs a fingerprint (the first fingerprint) in the fingerprint receiving area, after the terminal receives the first fingerprint and generates the fingerprint event, determines the running environment, and when there is no condition for executing the identity authentication operation, executes the operation (an operation corresponding to the first preset event) of returning to the main menu interface according to the Home button event (the first preset event) and returns to the main menu interface.

In addition, for the setting of the first preset event, the first preset event may be set according to frequency of using a particular application program (a short messaging service, and an instant chat program) or executing a particular operation (an operation of returning to a main menu interface, and an operation of exiting an application program interface) by the user.

When the user needs to execute the second preset event (the user presets the second preset event as an event to enter a dial interface), the user inputs a fingerprint (the first fingerprint) in the fingerprint receiving area. The user inputs a fingerprint (the second fingerprint) in the fingerprint receiving area again 1 s (a system default preset time is 2 s) after the terminal receives the first fingerprint, and in this case, the terminal determines that a fingerprint is received again within a preset time, generates the second preset event, and then opens the dial interface according to the second preset event.

In addition, in the present disclosure, generation of a predetermined event (the second preset event) may also be triggered by inputting a fingerprint twice within a preset time. When the user uses multiple application programs or executes multiple operations relatively frequently, whether to execute the first preset event or the second preset event may be determined by a quantity of times of inputting a fingerprint within a predetermined time.

It should be noted that the present disclosure does not limit a quantity of the fingerprint receiving areas. That is, the fingerprint receiving area in the present disclosure is at least one area. When the terminal includes one fingerprint receiving area, a cost of the terminal may be lowered while operation steps of using a terminal are simplified. When the terminal includes at least two fingerprint receiving areas, at the same time when the operation steps of using the terminal are simplified, frequent use of a same fingerprint receiving area may be avoided, so as to prevent a service life of the fingerprint sensor from being shortened.

Figure 3A:
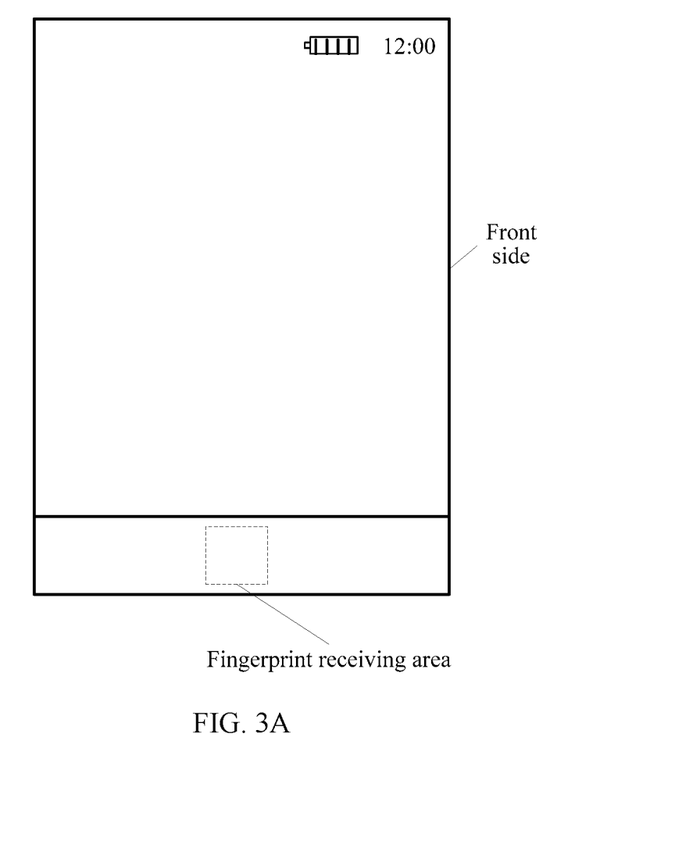
FIG. 3A is a schematic diagram of a position of a fingerprint receiving area in a fingerprint event processing method according to an embodiment of the present disclosure.
Figure 3B:
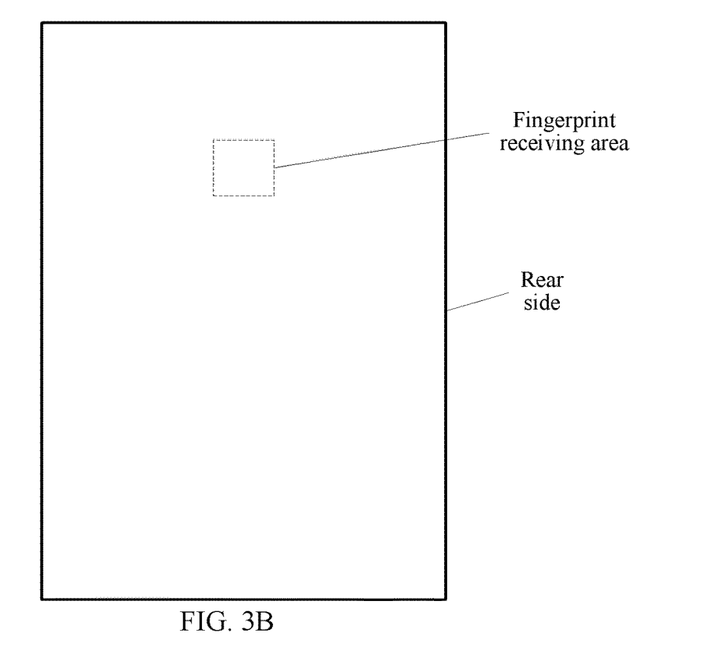
FIG. 3B is another schematic diagram of a position of a fingerprint receiving area in a fingerprint event processing method according to an embodiment of the present disclosure.
Figure 3C:
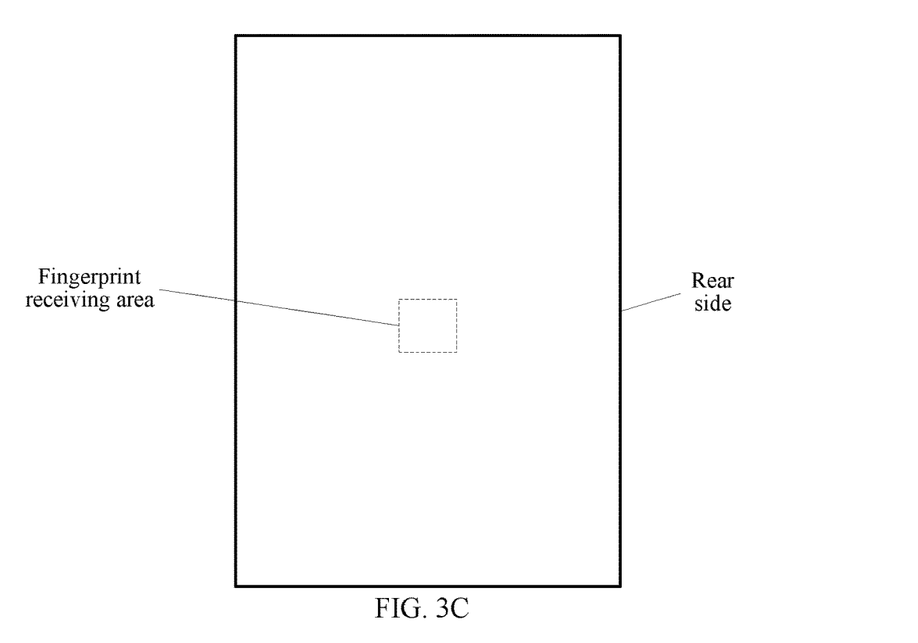
FIG. 3C is still another schematic diagram of a position of a fingerprint receiving area in a fingerprint event processing method according to an embodiment of the present disclosure.
Figure 3D:
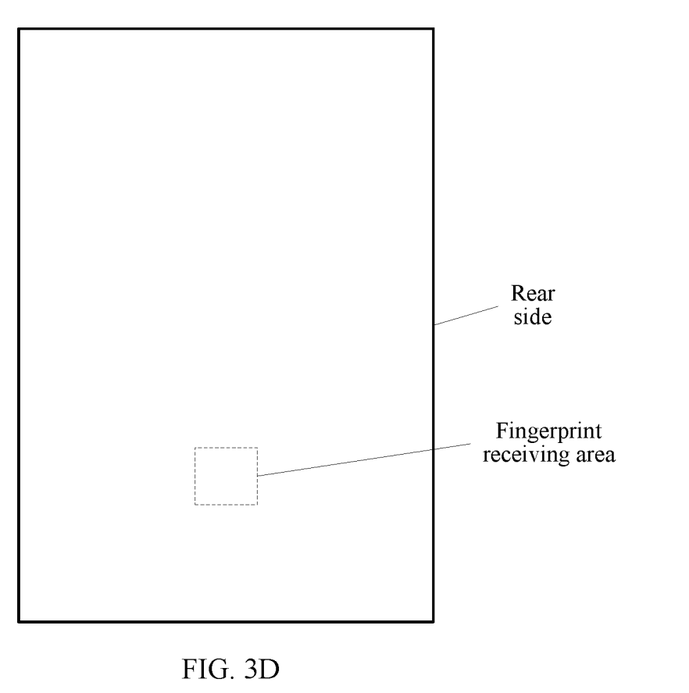
FIG. 3D is yet another schematic diagram of a position of a fingerprint receiving area in a fingerprint event processing method according to an embodiment of the present disclosure.

Further optionally, the present disclosure does not limit a specific range of the fingerprint receiving area. That is, the fingerprint receiving area may be located at a lower end of a front side of the terminal, as shown in FIG. 3A, may be located at an upper end of a rear side of the terminal, as shown in FIG. 3B, may be located at a middle end, as shown in FIG. 3C, may be located at a lower end, as shown in FIG. 3D, or may be located in any other position.

It can be understood that when the fingerprint receiving area is located on the rear side of the terminal, as long as there is no more functional buttons and operation of the terminal is not affected, an area ratio of the screen to the terminal may be increased, thereby improving user experience.

Figure 4:
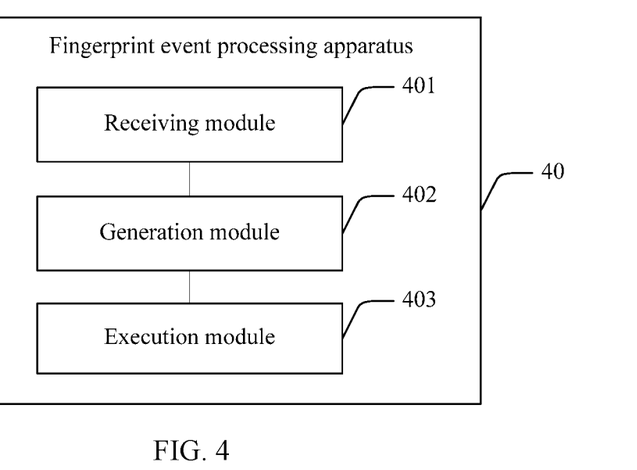
FIG. 4 is a schematic diagram of a fingerprint event processing apparatus according to an embodiment of the present disclosure.

With reference to any one or any several descriptions in the foregoing figures, an embodiment of the present disclosure provides a fingerprint event processing apparatus 40. As shown in FIG. 4, the apparatus 40 includes: a receiving module 401, a generation module 402, and an execution module 403.

The receiving module 401 is configured to: receive a first fingerprint by using a fingerprint sensor, and provide the first fingerprint to the generation module 402.

The generation module 402 is configured to generate a fingerprint event according to the first fingerprint.

The execution module 403 is configured to: when an operation to be executed includes an identity authentication operation, execute the identity authentication operation according to the fingerprint event; and when the operation to be executed does not include the identity authentication operation, execute an operation corresponding to a first preset event according to the first preset event.

The first preset event may be a Home button event and the like.

Further optionally, in the process of when the operation to be executed does not include the identity authentication operation, executing an operation corresponding to a first preset event according to the first preset event, the execution module 403 is specifically configured to: when the operation to be executed does not include the identity authentication operation, determine a running current application scenario; and execute the operation corresponding to the first preset event according to the first preset event corresponding to the current application scenario.

Further optionally, the generation module 402 is further configured to generate the first preset event according to the first fingerprint.

Further optionally, the receiving module 401 is further configured to: receive a second fingerprint by using the fingerprint sensor within a preset time after receiving the first fingerprint by using the fingerprint sensor; and provide the second fingerprint to the generation module 402.

The generation module 402 is further configured to generate the second preset event according to the first fingerprint and the second fingerprint.

The execution module 403 is further configured to execute an operation corresponding to a second preset event according to the second preset event after the receiving module 401 receives the second fingerprint.

Further optionally, in the process of executing an operation corresponding to a second preset event according to the second preset event when receiving the second fingerprint by using the fingerprint sensor within the preset time, the execution module 403 is specifically configured to: when receiving the second fingerprint by using the fingerprint sensor within the preset time, determine a running current application scenario; and execute the operation corresponding to the second preset event according to the second preset event corresponding to the current application scenario.

In this embodiment of the present disclosure, the receiving module receives a first fingerprint by using a fingerprint sensor; the generation module generates a fingerprint event according to the first fingerprint; when an operation to be executed includes an identity authentication operation, the execution module executes the identity authentication operation according to the fingerprint event; and when the operation to be executed does not include the identity authentication operation, the execution module executes an operation corresponding to a first preset event according to the first preset event. In this embodiment of the present disclosure, a fingerprint event may trigger different operations. After a terminal generates a fingerprint event, whether the terminal executes an identity authentication operation or an operation corresponding to a first preset event is determined according to whether an operation to be executed by the terminal includes the identity authentication operation, so as to simplify operation steps of using the terminal.

Figure 5:
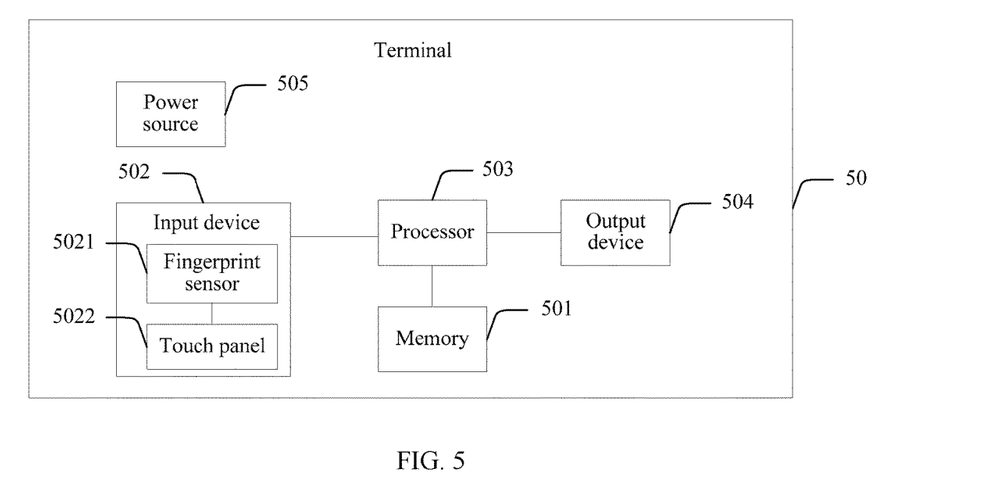
FIG. 5 is a schematic structural diagram of hardware of a terminal according to an embodiment of the present disclosure.

With reference to any one or any several descriptions in the foregoing drawings, an embodiment of the present disclosure provides a terminal 50. As shown in FIG. 5, the terminal 50 includes: a memory 501, an input device 502, a processor 503, an output device 504, and a power source 505. These components may communicate by using one or more buses, or these components are connected directly and communicate directly. A person skilled in the art may understand that the structure of the terminal shown in the figure does not constitute a limitation to the present disclosure and may be a bus-form structure or a star-form structure, and the terminal may further include more or components or fewer components than those shown in the figure, or some components may be combined, or a different component deployment may be used. In an implementation manner of the present disclosure, the terminal may be any portable terminal, and includes, but is not limited to, a mobile phone, a mobile computer, a tablet computer, a PDA (personal digital assistant), a media player, a smart television, a smart watch, smart glasses, a smart wristband, and the like. It should be noted that although the apparatus shown in FIG. 5 only shows the foregoing modules, in a specific implementation process, a person skilled in the art should know that the terminal further includes other devices required to implement normal running.

The input device 502 is configured to implement interaction between a user and a terminal and/or input of information to the terminal. For example, the input device 502 may receive number or character information input by the user, to generate signal input related to a user setting or function control. In a specific implementation manner of the present disclosure, the input device 502 may include a fingerprint sensor 5021 that may receive a fingerprint input by the user, may further include a touch panel 5022, may also be another human-machine interaction interface such as a physical input key and a microphone, and may further include another external information capturing apparatus (not shown in the figure) such as a camera. The touch panel, which is also referred to as a touchscreen or a touch screen, can obtain an operation action of the user on or near the touch panel, For example, an operation action of the user on the touch panel or at a position near the touch panel by using any suitable object or accessory such as a finger or a stylus, and drive a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and then sends the contact coordinates to the processor 503. The touch controller may further receive a command sent from the processor 503 and execute the command. In addition, the touch panel may be a resistive, capacitive, infrared, or surface acoustic wave touch panel. In another implementation manner of the present disclosure, the physical input key used by the input module 502 may include, but is not limited to, one or more of a physical keyboard, a functional key (such as a volume control key or a switch key), a trackball, a mouse, and a joystick. The input device 502 in the form of the microphone may obtain a voice input by the user or from an environment and convert the voice into a command that is in the form of an electrical signal and that can be executed by the processor 503.

The processor 503 is a control center of the terminal, uses various interfaces and lines to connect various parts of the entire terminal, and executes various functions of the terminal and/or processes data by running or executing software programs and/or modules stored in the memory 501 and invoking data stored in the memory 501. The processor 503 may be formed of an IC (integrated circuit) and, for example, may be formed of a single-package IC or may be formed of multiple packaged ICs that are connected and that have a same function or different functions. For example, the processor 503 may include only a CPU (central processing unit) or may be a combination of a CPU, a digital signal processor DSP (digital signal processor), a GPU (graphic processing unit), and a control chip (for example, a baseband chip). In an implementation manner of the present disclosure, the CPU may be a single computing core or may include multiple computing cores.

The output device 504 may include, but is not limited to, a visual output module and a sound output and touch output module. The visual output module is configured to output text, a picture and/or a video. The visual output module may include a display panel, for example, a display panel configured in a form of an LCD (liquid crystal display), an OLED (organic light-emitting diode), and an FED (field emission display). Alternatively, the visual output module may include a reflective display, for example, an electrophoretic display or a display using interferometric modulation of light. The visual output module may include a single display or multiple displays of different sizes. In a specific implementation manner of the present disclosure, the touch panel used in the input device 502 may also be used as a display panel of the output device 504. For example, after detecting touch on the touch panel or a gesture operation near the touch panel, the touch panel transmits the touch or gesture operation to the processor 503 to determine a type of a touch event, and subsequently, the processor 503 provides corresponding visual output on the display panel according to the type of the touch event. Although in FIG. 8, the input device 502 and the output device 504 are used as two independent parts to implement an input function and an output function of the terminal, in some embodiments, the touch panel and the display panel can be integrated to implement the input function and the output function of the terminal. For example, the visual output module may display various GUIs (graphic user interfaces) for use as virtual control components, which may include, but are not limited to, windows, scroll bars, icons, and scrapbooks for the user to operate in a touch manner.

In a specific implementation manner of the present disclosure, the visual output module includes a filter and an amplifier, configured to filter or amplify a video output by the processor 503. An audio output module includes a digital-analog converter, configured to convert an audio signal output by the processor 503 from a digital format into an analog format.

The memory 501 may be configured to store software programs and modules, that is, store information including a program instruction. The processor 503 executes various functional applications of the terminal and implements data processing by running software programs and modules stored in the memory 501. The memory 501 mainly includes a program storage area and a data storage area. The program storage area may store an operating system, an application required by at least one function, such as a sound play program and an image play program. The data storage area may store data (such as audio data and an address book) created according to use of the terminal and the like. In a specific implementation manner of the present disclosure, the memory 501 may include a volatile memory such as an NVRAM (nonvolatile random access memory), a PRAM (phase change random access memory), and an MRAM (magetoresistive random access memory), and may further include a nonvolatile memory such as at least one magnetic disk storage device, an EEPROM (electrically erasable programmable read-only memory), and a flash memory device such as a NOR flash memory or an NAND flash memory. The nonvolatile memory stores an operating system and an application program that are executed by a processing module. The processor 503 loads a running program and data from the nonvolatile memory to a memory and stores digital content in a large quantity of storage apparatuses. The operating system is used for control and management of conventional system tasks, such as memory management, storage device control, and management of the power source 505, and various components and/or drivers that facilitate communication between various types of software and hardware. In an implementation manner of the present disclosure, the operating system may be the Android system of the Google company, the iOS system developed by the Apple company, or the Windows operating system developed by the Microsoft company, or may be a built-in operating system such as Vxworks.

The power source 505 is configured to supply power to different components of the terminal to keep the terminal running. It is generally understood that the power source 505 may a built-in battery such as a common lithium ion battery and a nickel-hydrogen battery, and may also include an external power source, for example, an AC adapter, that supplies power to the terminal. In some implementation manners of the present disclosure, the power source 505 may further be more widely defined, and for example, may further include a power source management system, a charging system, a power source fault detection circuit, a power source converter or an inverter, a power source state indicator (for example, a light emitting diode), and any other component associated with generation, management, and distribution of electric energy of the terminal.

With reference to the specific implementation manners of the present disclosure, the input device 502 is described mainly by using the fingerprint sensor 5021 as an example, and the fingerprint sensor 5021 is configured to receive a first fingerprint by using the fingerprint sensor.

The processor 503 is coupled to the memory 501 and the fingerprint sensor 5021, is configured to control execution of the program instruction, and is specifically configured to: generate a fingerprint event according to the first fingerprint; when an operation to be executed includes an identity authentication operation, execute the identity authentication operation according to the fingerprint event; and when the operation to be executed does not include the identity authentication operation, execute an operation corresponding to a first preset event according to the first preset event.

The first preset event may be a Home button event and the like.

Further optionally, the processor 503 is further configured to generate the first preset event according to the first fingerprint.

Further optionally, in the process of when the operation to be executed does not include the identity authentication operation, executing an operation corresponding to a first preset event according to the first preset event, the processor 503 is specifically configured to: when the operation to be executed does not include the identity authentication operation, determine a running current application scenario; and execute the operation corresponding to the first preset event according to the first preset event corresponding to the current application scenario.

Further optionally, the fingerprint sensor 5021 is further configured to receive a second fingerprint by using the fingerprint sensor within a preset time after receiving the first fingerprint; and the processor 503 is further configured to generate a second preset event according to the first fingerprint and the second fingerprint after the fingerprint sensor receives the second fingerprint.

The processor 503 is further configured to execute an operation corresponding to the second preset event according to the second preset event.

Further optionally, in the process of executing an operation corresponding to a second preset event according to the second preset event when receiving the second fingerprint by using the fingerprint sensor within the preset time, the processor 503 is specifically configured to: when receiving the second fingerprint within the preset time, determine a running current application scenario; and execute the operation corresponding to the second preset event according to the second preset event corresponding to the current application scenario.

In this embodiment of the present disclosure, a fingerprint event may trigger different operations. After a terminal generates a fingerprint event, whether the terminal executes an identity authentication operation or an operation corresponding to a first preset event is determined according to whether an operation to be executed by the terminal includes the identity authentication operation, so as to simplify operation steps of using the terminal.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A fingerprint event processing method comprising:
   receiving, by a terminal having a fingerprint sensor, a first fingerprint by using the fingerprint sensor during a running environment of a current application of the terminal;
   generating, by the terminal, a fingerprint event according to the first fingerprint;
   executing, by the current application, an identity authentication operation according to the fingerprint event when the running environment of the current application includes a condition for the identity authentication operation;
   executing, by the current application, a first operation corresponding to a first event according to a first application scenario unrelated to the identity authentication operation when the running environment of the current application does not include the condition for the identity authentication operation; and
   when the terminal receives a second fingerprint using the fingerprint sensor within a determined time period after receiving the first fingerprint, executing, by the current application, a second operation corresponding to a second event according to a second application scenario unrelated to the identity authentication operation and different from the first operation.

2. The method according to claim 1, wherein the first event is a home button event.

3. The method according to claim 1, wherein the first event may be set according to frequency of using a particular application program or executing a particular operation by a terminal user.

4. The method according to claim 1, wherein when the user uses multiple application programs or executes multiple operations, whether to execute the first or the second event is determined by a quantity of times of inputting a fingerprint within a predetermined time.

5. The method according to claim 1, wherein before generating the second event, the current application determines whether the second operation includes the identity authentication operation; and
   when the second operation does not include the identity authentication operation, the current application generates the second event according to the first and second fingerprints.

6. The method according to claim 1, wherein, after receiving the second fingerprint, the current application does not first determine whether the second operation includes the identity authentication operation before generating the second event according to the first and second fingerprints.

7. The method according to claim 1, wherein the second fingerprint is different from the first fingerprint.

8. The method according to claim 1, wherein the first and second operations correspond to different current application scenarios.

9. A terminal comprising:
   a processor;

a memory in communication with the processor and configured to store information comprising program instructions of a current application for execution by the processor;

a fingerprint sensor in communication with the processor and configured to receive a first fingerprint, and provide the first fingerprint to the processor during a running environment of the current application; and the processor coupled to the memory and the fingerprint sensor and configured to control execution of the program instructions of the current application to provide at least the following operations:

generate a fingerprint event according to the first fingerprint;

execute an identity authentication operation according to the fingerprint event when the running environment of the current application includes a condition for the identity authentication operation;

execute a first operation corresponding to a first event according to a first application scenario unrelated to the identity authentication operation when the running environment of the current application does not include the condition for the identity authentication operation; and when the terminal receives a second fingerprint using the fingerprint sensor within a determined time period after receiving the first fingerprint, executing, by the current application, a second operation corresponding to a second event according to a second application scenario unrelated to the identity authentication operation and different from the first operation.

10. The terminal according to claim 9, wherein the first event is a home button event.

11. The terminal according to claim 9, wherein the first event may be set according to frequency of using a particular application program or executing a particular operation by a terminal user.

12. The terminal according to claim 9, wherein when the user uses multiple application programs or executes multiple operations, whether to execute the first or the second event is determined by a quantity of times of inputting a fingerprint within a predetermined time.

13. The terminal according to claim 9, wherein before processor is further configured by the execution of the current application to generate the second event, the processor is configured by the current application to determine whether the second operation includes the identity authentication operation; and when the second operation does not include the identity authentication operation, the processor is further configured by the execution of the current application to generate the second event according to the first and second fingerprints.

14. The terminal according to claim 9, wherein, after receiving the second fingerprint, the processor is configured by the execution of the current application to not first determine whether the second operation includes the identity authentication operation before generating the second preset event according to the first and second fingerprints.

15. The terminal according to claim 9, wherein the second fingerprint is different from the first fingerprint.

16. The terminal according to claim 9, wherein the first and second operations correspond to different current application scenarios.

17. A non-transitory computer-readable storage medium comprising instructions of an application that, when executed by a processor, cause a terminal having a fingerprint sensor to carry out at least the following operations:

receiving a first fingerprint from the fingerprint sensor during a running environment of the application of the terminal;

generating a fingerprint event according to the first fingerprint;

executing an identity authentication operation according to the fingerprint event when the running environment of the application includes a condition for the identity authentication operation;

executing a first operation corresponding to a first event according to a first application scenario unrelated to the identity authentication operation when the running environment of the current application does not include the condition for the identity authentication operation; and when the terminal receives a second fingerprint using the fingerprint sensor within a determined time period after receiving the first fingerprint, executing, by the current application, a second operation corresponding to a second event according to a second application scenario unrelated to the identity authentication operation and different from the first operation.

18. The non-transitory computer-readable storage medium according to claim 17, wherein the first event may be set according to frequency of using a particular application program or executing a particular operation by a terminal user.

19. The non-transitory computer-readable storage medium according to claim 17, wherein when the user uses multiple application programs or executes multiple operations, whether to execute the first or the second event is determined by a quantity of times of inputting a fingerprint within a predetermined time.

20. The non-transitory computer-readable storage medium according to claim 17, wherein before generating the second event, the current application determines whether the second operation includes the identity authentication operation; and when the second operation does not include the identity authentication operation, the current application generates the second event according to the first and second fingerprints.

21. The non-transitory computer-readable storage medium according to claim 17, wherein, after receiving the second fingerprint, the current application does not first determine whether the second operation includes the identity authentication operation before generating the second event according to the first and second fingerprints.

22. The non-transitory computer-readable storage medium according to claim 17, wherein the first and second operations correspond to different current application scenarios.

* * * * *